(12) United States Patent
Medeiros, II et al.

(10) Patent No.: US 8,656,419 B2
(45) Date of Patent: Feb. 18, 2014

(54) DYNAMIC DISTRIBUTED EVALUATOR

(75) Inventors: Raymond R. Medeiros, II, Pete Beach, FL (US); Robert E. Hucik, Simi Valley, CA (US); Beau Croteau, Islip Terrace, NY (US); Gregory L. Bodine, Cary, NC (US)

(73) Assignee: CA, Inc., Islandia, NY (US)

(*) Notice: Subject to any disclaimer, the term of this patent is extended or adjusted under 35 U.S.C. 154(b) by 893 days.

(21) Appl. No.: 12/497,323

(22) Filed: Jul. 2, 2009

(65) Prior Publication Data

US 2011/0004889 A1    Jan. 6, 2011

(51) Int. Cl.
*G06F 3/00* (2006.01)
*G06F 9/44* (2006.01)
*G06F 9/46* (2006.01)
*G06F 13/00* (2006.01)
*G06F 15/16* (2006.01)
*G06F 15/173* (2006.01)

(52) U.S. Cl.
USPC ........... 719/330; 718/100; 718/102; 718/106; 709/201; 709/202; 709/226

(58) Field of Classification Search
None
See application file for complete search history.

(56) References Cited

U.S. PATENT DOCUMENTS

| | | | | |
|---|---|---|---|---|
| 5,307,490 | A * | 4/1994 | Davidson et al. | 719/328 |
| 6,249,822 | B1 * | 6/2001 | Kays et al. | 719/330 |
| 6,321,274 | B1 * | 11/2001 | Shakib et al. | 719/330 |
| 6,457,066 | B1 * | 9/2002 | Mein et al. | 719/330 |
| 2001/0013074 | A1 * | 8/2001 | Marslano | 709/330 |
| 2001/0032320 | A1 * | 10/2001 | Abdelnur et al. | 713/201 |
| 2004/0078486 | A1 * | 4/2004 | Salahshoor et al. | 709/245 |
| 2004/0088140 | A1 * | 5/2004 | O'Konski et al. | 702/183 |
| 2004/0194111 | A1 * | 9/2004 | Marcey et al. | 719/310 |
| 2005/0114534 | A1 * | 5/2005 | Lee | 709/230 |
| 2006/0212524 | A1 * | 9/2006 | Wu et al. | 709/206 |
| 2006/0230121 | A1 * | 10/2006 | Arndt et al. | 709/217 |
| 2008/0313660 | A1 * | 12/2008 | Malik et al. | 719/330 |
| 2009/0094314 | A1 * | 4/2009 | Chen | 709/203 |
| 2009/0204694 | A1 * | 8/2009 | Kaneko | 709/223 |
| 2010/0198855 | A1 * | 8/2010 | Ranganathan et al. | 707/764 |

* cited by examiner

*Primary Examiner* — Charles Swift
(74) *Attorney, Agent, or Firm* — Baker Botts, LLP

(57) ABSTRACT

According to one embodiment a first node of a network communicates with a second node of the network. The first node tells the second node to perform an operation and how to perform the operation using computer code. Additionally, the first node tells the second node what to do with the result of the operation.

20 Claims, 1 Drawing Sheet

DYNAMIC DISTRIBUTED EVALUATOR

TECHNICAL FIELD

The present disclosure relates generally to distributed computing, and more specifically to a dynamic distributed evaluator.

BACKGROUND

Distributed computing methods, such as Remote Procedure Call (RPC), may allow a client to execute an operation on a server. The operation may be pre-compiled, and both the client and the server may know the operations that the server is capable of performing.

SUMMARY

According to one embodiment a first node of a network communicates with a second node of the network. The first node tells the second node to perform an operation and how to perform the operation using computer code. Additionally, the first node tells the second node what to do with the result of the operation.

Certain embodiments of the invention may provide one or more technical advantages. A technical advantage of one embodiment may be that an operation may be called without knowing the node that will perform the operation, the code that will be required, or when the code will be needed. Another technical advantage of one embodiment may be that nodes may share knowledge for performing an operation. In some embodiments, knowledge may be shared among nodes using different operating systems and/or programming languages. Knowledge sharing may allow an application to be distributed, with different nodes performing different operations of the application. Thus, an application may run with increased efficiency. In some embodiments, code may be updated in real-time, without having to deploy and install compiled code and without downtime. In some embodiments, executed code may be removed from a node to increase network security.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

Figure 1:
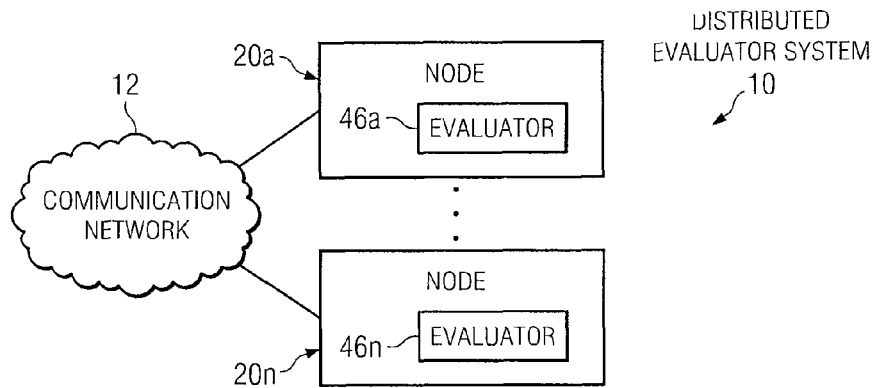
FIG. 1 illustrates an example of a dynamic distributed evaluator system.
Figure 2:
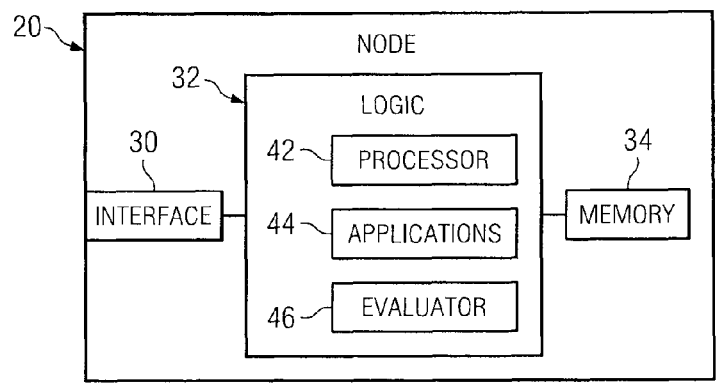
FIG. 2 illustrates an example of a node of a dynamic distributed evaluator system.
Figure 3:
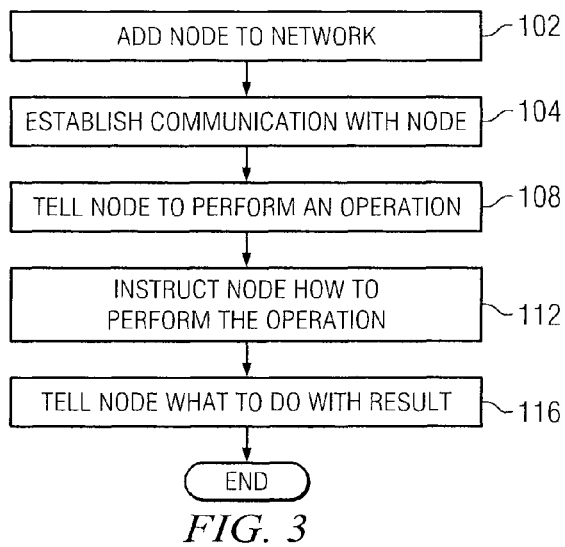
FIG. 3 illustrates an example of a method for dynamic distributed evaluation.

Embodiments of the present invention and its advantages are best understood by referring to FIGS. 1-3 of the drawings, like numerals being used for like and corresponding parts of the various drawings.

FIG. 1 illustrates an example of a dynamic distributed evaluator system 10. The dynamic distributed evaluator system 10 may comprise a network including a communication network 12 and a plurality of nodes 20. In some embodiments, the dynamic distributed evaluator 10 may be configured to run an application. The application may comprise a number of operations that the nodes 20 may perform using code. Each node 20 may comprise an evaluator 46 for sending and receiving instructions, locating and transmitting code, and/or performing operations. The instructions and code may be sent over the communication network 12 to the other nodes 20 of the dynamic distributed evaluator system 10.

In some embodiments, the communication network 12 may be any network for facilitating communication between the nodes 20, including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. The dynamic distributed evaluator system 10 may be heterogeneous. For example, different nodes 20 may use different operating systems, such as UNIX, LINUX, or WINDOWS, and/or one or more different programming languages, such as JAVA or C.

In some embodiments, the nodes 20 of dynamic distributed evaluator system 10 may act as peers, and each node 20 may be configured to send and receive instructions and/or code for performing an operation. In some embodiments, the code may be sent through the dynamic distributed evaluator system 10 in real-time and as needed. As a result, a node 20 may perform an operation without loading the code in advance and without storing the code locally.

In some embodiments, an application may be distributed such that multiple nodes 20 perform the operations. The distributed nature of the application may be transparent to a node 20 that calls for the performance of an operation. For example, local and remote calls may have the same outward semantics so that a node 20 may not know if the operation it called is being performed by another node 20.

Additionally, an instruction requesting an operation may be sent without knowing the specific node 20 that has the resources to perform the operation or how to reach that node 20. The instruction may simply request a resource, and the evaluator 46 may then find the resource within the system. In some embodiments, a request for a resource may be sent without knowing if the resource exists in the system at all. If the resource does not exist, the request may fail.

FIG. 2 illustrates an example of a node 20 of a dynamic distributed evaluator system. In certain embodiments, a node 20 may instruct another node to perform an operation using code. The code may be provided to the node performing the operation in real-time, as needed. In some embodiments, a node may call operations that use different programming languages and/or operating systems.

In certain embodiments, node 20 may include an interface 30, logic 32, memory 34, and/or other suitable element. Interface 30 receives input, sends output, processes the input and/or output, and/or performs other suitable operation. In certain embodiments, interface 30 receives an instruction and outputs a result. Interface 30 may comprise hardware and/or software.

Logic 32 performs the operations of the component, for example, executes instructions to generate output from input. Examples of instructions may include an operation to perform, how to perform the operation, the code to use, how to get the code, how to format the result, what to do with the result, and/or a combination. An operation may be combined with other operations to form an application. Examples of applications include user applications, such as web browsers, e-mail programs, word processors, games, and utilities, as well as system applications, such as assemblers, compilers, and file management tools. Operations may be any specific actions, tasks, procedures, and/or functions of the application. As an example, a word processing application may include operations for handling text, such as copying, pasting, formatting, spell checking, printing, saving, and so on. As another example, an application for creating a user account may include the operations of accepting a username and a password, configuring an authorization level, establishing default account settings, and so on.

Logic 32 may include hardware (such as a processor 40), software (such as applications 42 and evaluator 46), and/or other logic. Logic 32 may be encoded in one or more tangible media and may perform operations when executed by a computer. Certain logic 32, such as a processor 40, may manage the method of performing of a component. Examples of a processor 40 include one or more computers, one or more microprocessors, one or more hardware or software applications, and/or other logic.

In particular embodiments, the evaluator 46 may refer to an environment that contains symbol bindings, such as a table having a reference to a symbol. In some embodiments, the evaluator 46 may include multiple tables, and two or more of the tables may form a set. As an example, a set may include a first table having a reference to a second table which in turn may have a reference to a symbol.

The structure of the tables and the relationships among the tables may vary depending on the features of the language being used and the language implementor. As an example, a first table may contain references to unevaluated code that is evaluated recursively, a second table for dynamic variable bindings, and a third table for functions or their resulting values from previous evaluation. The evaluator 46 may take the "code" or form of a program and expand it to be executed on a machine via a series of lookup calls based on a symbol. A lookup call may result in additional lookups in other tables, such as closure tables or variable tables.

In some embodiments, evaluators 46 may be distributed over multiple nodes and across various platforms to provide a mechanism of transport and transparent reference between the evaluators 46. The reference may be transparent because each evaluator 46 may believe that the symbols in its own table may be evaluated locally, which may or may not be the actual case. In some embodiments, the evaluators 46 may provide the actual form itself instead of a reference, which may allow for delaying evaluation across a multitude of remote systems. The evaluator 46 may be implemented in any suitable system, such as a mainframe, a directory, a website, or a combination.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 34 stores information. Memory 34 may comprise one or more tangible, computer-readable, and/or computer-executable storage medium, and may exclude signals or carrier waves. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to node 20 without departing from the scope of the invention. The components of node 20 may be integrated or separated. Moreover, the operations of node 20 may be performed by more, fewer, or other components. Additionally, operations of node 20 may be performed using any suitable logic comprising software, hardware, and/or other logic. As used in this document, "each" refers to each member of a set or each member of a subset of a set.

FIG. 3 illustrates an example of a method 100 for dynamic distributed evaluation. The method 100 may include adding a node to a network comprising a dynamic distributed evaluation system, establishing communication with the node, telling the node to perform an operation, instructing the node how to perform the operation, and telling the node what to do with the result.

At step 102, a new node may be added to the network using any suitable method. In some embodiments, the new node may be added to an existing network. In the embodiment, the nodes of the network are peers that have access to substantially the same operations, so any node of the network may accept a request to be added to the network from the new node. Thus, designating a particular node as a directory for adding new nodes may not be required. Once a node has been added, it may send instructions to and/or receive instructions from any other node of the network.

According to some embodiments, a first node may establish communication with a second node at step 104. For example, the first and second nodes may communicate through a communication network.

At step 108, the first node may tell the second node to perform an operation. The first node may send instructions without knowing the code that will be required, when the code will be needed, or the identity of the node that will perform the operation. In some embodiments, code, data, and protocol may use the same general syntax. As a result, instructions may be sent without being serialized into an intermediate format. The instructions may include inputs, expected outputs, and/or aspect oriented features to control the execution and results on remote nodes.

In some embodiments, the first node may send related instructions to multiple nodes. As an example, operations X, Y, and Z may be related operations of a common application. In some embodiments, the common application may add a user to a computer network, and the operation X may create a WINDOWS account for the user, the operation Y may create a UNIX account for the user, and the operation Z may create an internet account for the user. The first node may instruct the second node to perform operations X and Z, and it may instruct a third node to perform operation Y. In some embodiments, the instructions to the second and third nodes may be sent at substantially the same time, and the nodes may perform the instructions in parallel.

The first node may instruct the second node how to perform the operation using code in step 112. In some embodiments, the second node may not have the code at the time the instruction is received. Accordingly, the first node may provide the code to the second node or tell the second node how to obtain the code. For example, the first node may tell the second node a location of the code within the network. In some embodiments, the code may be located on a third node. The second node may request the code from the third node or instruct the third node to perform the operation. As another example, the first node may provide the second node with a reference symbol indicating a source node for the code. As an example, the reference symbol "foo" may refer to code F. Each node of the network may include the reference symbol foo. The reference symbol foo may indicate that a particular node, such as node F, is a source node storing a copy of the code F. The second node may locate node F according to the reference symbol foo and may 1) request node F to execute the code F, or 2) request node F to send the code F. In some embodiments, the second node may make a local copy of the code F and may tell the other nodes that it is a new source for calling the code F indicated by the reference symbol foo.

In some embodiments, local copies of code may be located on one or more nodes. For example, a node may store a local copy of code that it receives to perform an operation. As another example, a node may detect new code has been introduced somewhere on the network, and it may store a copy upon detecting the new code. By storing a local copy of the code, a node may learn to perform certain operations or portions of certain operations that it may access in the future. Additionally, the overall knowledge bank of a network may grow if multiple nodes are sources for the code.

The dynamic distributed evaluator, however, does not require storing code locally. For example, executed code may be removed from a node, and the node may request the code from a peer as needed. The code may be removed from a node by any suitable method. In some embodiments, a first node may instruct a second node to remove the code once it has been executed. In some embodiments, the code may be programmed to remove itself. For example, the code may remove itself upon the completion of a process or upon the expiration of a timer. Removing the code may include deleting the code, redefining the code, overwriting the code, or a combination. If the node needs to execute code that has been removed, another node of the network may provide it with the code. As a result, the nodes may use the same version of code, and the version may be kept current. Removing code and/or reducing the amount of code stored locally on a node may increase network security. For example, an unauthorized user may be unable to execute code that is not available to the node.

In some embodiments, code need not be pre-compiled. As an example, the node may be configured so that its only executable code is code configured to receive other code. The other code may be received and loaded dynamically when it is needed, without restarting the node. As a result, applications may be updated even while they are executing. For example, if updated code is located on the network, the code will take effect when the application calls the code to initiate the operation. Dynamic loading may allow new features to be pushed to an application by simply placing code on a node of the network. In some embodiments, the new features may be implemented without causing downtime or bouncing of services, and without using compiled binaries that may require updating to install a new feature.

Accordingly, the node may require less time to load code than that required by known systems. Known systems may use pre-compiled code in fixed configurations, and thus may require knowledge about the code before it may be loaded or executed. For example, new code may be received in a package form, and the package may need to be installed before it may be used. Installing a package may require restarting the known system so as not to interfere with modules, such as libraries, that may be in use whenever the system is running.

In some embodiments, the code operating in a heterogeneous network may comprise various programming languages and may be executed on various operating systems. As an example, a node may send instructions to add a new user to a computer network. The instructions may be sent without knowing the nodes that will add the new user or the code that will be required to add the new user to various systems. One or more of the nodes that receive the instructions may add the new user by calling and executing code. Different code may be used to add the new user to different systems of the computer network. For example, different code may be used to add a user to different types of operating systems as well as different applications such as email, websites, or other applications accessed using a user account.

In some embodiments, a dynamic distributed evaluator may access one or more native libraries to use code of any suitable operating system or programming language of a heterogeneous network. Examples of native libraries include those of an operating system, such as Shared Object (.SO), Pluggable Authentication Mode (PAM), or Dynamic Link Library (DLL) native libraries. In some embodiments, the native library may be accessed using an alternative library, such as JAVA Native Access (JNA), third party JAVA Archive (JAR) files, or any suitable alternative library. For example, binary code may be serialized, transmitted, cached and then loaded via the interpreter loader facility, such as JNA, on a remote node. New symbols may be created to allow a local evaluator to access the native functionality of the remote node's platform. Binding the symbol references across the distributed interpreter environment may allow the new symbols to be created via reference to the symbols on the remote node.

In some embodiments, the code available to a node may be controlled by authentication, authorization, and accounting (AAA) procedures. The AAA procedures may be run before, during, and/or after a node sends an instruction or performs an operation.

At step 116, the first node may instruct the second node what to do with the result of the operation. In some embodiments, the instructions may include returning the result to the first node, sending the result to a third node, or using the result in another operation. As an example, the first node may instruct the second node to perform operation X and return a result A to the third node. The first node may instruct the third node to use the result A to perform operation Y and to return a result B to the second node. The second node may be further instructed to use result B to perform operation Z and to return a result C to the first node. In some embodiments, the instructions may indicate a result format to be followed. For example, the result may be formatted so that it may be accepted as an input of a next operation.

As an example, an application for adding a user to a computer network may include an instruction to generate a result in a particular format. The first node may instruct the second node to perform the operations of obtaining a user's first and last name and generating a username. The first node may instruct the second node to format the username into a standard format. For example, the second node may be instructed to add the first initial of the first name to the last name, to add a number to the name if an existing user account has the same username, and to truncate the last name if a maximum number of characters is exceeded. After standardizing the username, the second node may forward the result to other nodes for adding the user to various systems of the network, such as WINDOWS, UNIX, and LINUX systems, internet accounts, et cetera.

After the first node tells the second node what to do with the result, the method ends.

Modifications, additions, or omissions may be made to the method without departing from the scope of the invention.

The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus, comprising a first node of a network, the first node comprising:
    an interface operable to:
        communicate with a second node of the network; and
    one or more processors operable to:
        tell a plurality of nodes to perform an operation comprising a procedure of an application, the plurality of nodes comprising a second node and one or more additional nodes;
        instruct the plurality of nodes how to perform the operation using computer code; and
        tell the plurality of nodes what to do with a result of the operation, and
        wherein the one or more processors does not know which one of the plurality of nodes will perform the operation.

2. The apparatus of claim 1, wherein the first node operable to instruct the plurality of nodes how to perform the operation using code further comprising:
    sending the code for performing the operation from the first node to the second node.

3. The apparatus of claim 1, the first node operable to instruct the plurality of nodes how to perform the operation using code further comprising:
    telling the second node where to find the code for performing the operation.

4. The apparatus of claim 1, wherein the first node operable to instruct the plurality of nodes how to perform the operation using code further comprising:
    providing the second node with a reference symbol, the reference symbol identifying the code to be used; and
    instructing the second node to:
        locate a source node, the source node having the code indicated by the reference symbol; and
        obtain the code from the source node.

5. The apparatus of claim 1, wherein the first node operable to tell the plurality of nodes what to do with the result of the operation further comprising:
    telling the second node to send the result to a third node.

6. The apparatus of claim 1, wherein the first node operable to tell the plurality of nodes what to do with the result of the operation further comprising:
    telling the second node to send the result to the first node.

7. The apparatus of claim 1, the code programmed to remove itself upon the completion of a. process or upon the expiration of a timer.

8. The apparatus of claim 1, further comprising the first node instructing the second node to remove the code upon completion of a process.

9. The apparatus of claim 1, wherein the first node operable to instruct the plurality of nodes how to perform the operation using code further comprising:
    instructing the second node to use a first code comprising a first programming language and a second code comprising a second programming language.

10. The apparatus of claim 1, further comprising:
    wherein the first node operable to instruct the plurality of nodes how to perform the operation using code further comprising:
        instructing the second node to use a first code configured to be executed on a first operating system; and
    the first node operable to instruct a third node to perform the operation using a second code configured to be executed on a second operating system.

11. The apparatus of claim 1, wherein:
    the first node operable to tell the second node what to do with the result of the operation comprises telling the second node to send the result to a third node; and
    the one or more processors is further operable to:
        instruct the third node to use the result of the operation performed by the second node to perform an additional operation by the third node; and
        instruct the third node to return the result of the additional operation performed by the third node to the second node.

12. A method, comprising:
    establishing communication with a plurality of nodes of a network;
    telling the plurality of nodes to perform an operation comprising a procedure of an application, the plurality of nodes comprising a second node and one or more additional nodes;
    instructing the plurality of nodes how to perform the operation using computer code; and
    telling the plurality of nodes what to do with a result of the operation, and
    wherein the one or more processors does not know which one of the plurality of nodes will perform the operation.

13. The method of claim 12, wherein the instructing the plurality of nodes how to perform the operation using code further comprising:
    sending the code for performing the operation to the plurality of nodes;
    telling the plurality of nodes where to find the code for performing the operation; or
    providing the plurality of nodes with a reference symbol identifying the code and instructing the node to obtain the code from a source node having the code indicated by the reference symbol.

14. The method of claim 12, wherein the telling the plurality of nodes what to do with the result of the operation further comprising:
    telling the plurality of nodes to send the result to another node.

15. The method of claim 12, the code programmed to remove itself upon the completion of a process or upon the expiration of a timer, 16. The method of claim 12, wherein the instructing the node plurality of plurality of nodes how to perform the operation using code further comprising:
    instructing the plurality of nodes to use a first code comprising a first programming language and a second code comprising a second programming language.

17. The method of claim 14, wherein the one or more processors is further operable to:
    instruct a third node to use the result of the operation performed by the second node to perform an additional operation by the third node; and
    instruct the third node to return the result of the additional operation performed by the third node to the second node.

18. An apparatus, comprising a first node of a network, the first node comprising:
    an interface operable to:
        communicate with a second node of the network and a third node of the network; and
    one or more processors operable to:
        initiate an application comprising a plurality of operations, each operation of the plurality of operations comprising a procedure of the application;

tell a plurality of nodes to perform a first operation, the plurality of nodes comprising the second node, third node, and one or more additional nodes;

instruct the plurality of nodes how to perform the first operation using computer code; and tell the plurality of nodes what to do with a result of the first operation, and wherein the one or more processors does not know which one of the plurality of nodes will perform the first operation.

19. The apparatus of claim 18, comprising:

instructing the second node to send the result of the first operation to the third node;

instructing the third node to use the result of the first operation as an input to the second operation.

20. The apparatus of claim 19, wherein the one or more processors is further operable to instruct the third node to return the result of the second operation performed by the third node to the second node.

\* \* \* \* \*